(12) United States Patent
Hart

(10) Patent No.: US 7,513,684 B2
(45) Date of Patent: Apr. 7, 2009

(54) CALCIUM SILICATE HYDRATE MATERIAL FOR USE AS BALLAST IN THERMOSTATIC EXPANSION VALVE

(75) Inventor: Charles M. Hart, Washington, MO (US)

(73) Assignee: Parker-Hannifin Corporation, Cleveland, OH (US)

( * ) Notice: Subject to any disclaimer, the term of this patent is extended or adjusted under 35 U.S.C. 154(b) by 86 days.

(21) Appl. No.: 11/353,384

(22) Filed: Feb. 14, 2006

(65) Prior Publication Data

US 2006/0182164 A1  Aug. 17, 2006

Related U.S. Application Data

(60) Provisional application No. 60/653,687, filed on Feb. 17, 2005.

(51) Int. Cl.
*G01K 1/16* (2006.01)
*F25B 37/00* (2006.01)

(52) U.S. Cl. .............................. 374/141; 62/222; 62/527

(58) Field of Classification Search ................ 62/527
See application file for complete search history.

(56) References Cited

U.S. PATENT DOCUMENTS

| | | | | |
|---|---|---|---|---|
| 2,199,258 A * | 4/1940 | Gray | ............................ | 210/283 |
| 2,573,151 A * | 10/1951 | Lange | ............................ | 62/212 |
| 2,669,849 A | 2/1954 | Lange | | |
| 2,702,723 A | 2/1955 | MacDougall | | |
| 3,927,829 A * | 12/1975 | Willner et al. | ............ | 236/92 B |
| 4,128,434 A | 12/1978 | Pusch | | |
| 4,131,638 A * | 12/1978 | Whitaker et al. | ............. | 264/333 |
| 4,136,528 A * | 1/1979 | Vogel et al. | ................... | 62/174 |
| 4,162,924 A * | 7/1979 | Kubo et al. | ................. | 106/681 |
| 4,230,765 A | 10/1980 | Takahashi et al. | | |
| 4,266,408 A * | 5/1981 | Krause | ......................... | 62/474 |
| 4,274,881 A * | 6/1981 | Langton et al. | ............. | 106/698 |
| 4,447,380 A * | 5/1984 | Shannon et al. | ............... | 264/82 |
| 4,523,955 A | 6/1985 | Helser | | |
| 4,963,517 A * | 10/1990 | Goto et al. | ................... | 501/122 |
| 5,044,551 A * | 9/1991 | Tanaka et al. | ............. | 236/92 B |
| 5,228,619 A | 7/1993 | Yano et al. | | |
| 5,297,728 A * | 3/1994 | Yano et al. | ................ | 236/92 B |
| 5,300,355 A * | 4/1994 | Mifune et al. | ............... | 428/215 |
| 5,419,143 A | 5/1995 | Leonard et al. | | |
| 5,866,228 A * | 2/1999 | Awata | ......................... | 428/69 |

(Continued)

FOREIGN PATENT DOCUMENTS

JP    058125653    *  7/1983

(Continued)

OTHER PUBLICATIONS

Garbev et al., "Inorganic Polymers in Cement Based Materials"; Nachrinten aus dem institut fur Technische Chemie; 2002.

(Continued)

*Primary Examiner*—Gail Verbitsky
(74) *Attorney, Agent, or Firm*—Renner, Otto, Boisselle & Sklar, LLP

(57) ABSTRACT

A thermal sensing bulb for an expansion valve, the bulb containing a ballast material, the ballast material including a plurality of particles including a calcium silicate hydrate.

14 Claims, 2 Drawing Sheets

U.S. PATENT DOCUMENTS

| | | | |
|---|---|---|---|
| 5,943,871 A | 8/1999 | Ito et al. | |
| 5,957,376 A | 9/1999 | Fujimoto et al. | |
| 6,074,263 A * | 6/2000 | Sanders et al. | 445/23 |
| 6,223,994 B1 * | 5/2001 | Fukuda et al. | 236/92 B |
| 6,321,995 B1 | 11/2001 | Badovick et al. | |
| 6,338,799 B1 | 1/2002 | Fukushima et al. | |
| 6,438,992 B1 | 8/2002 | Smith et al. | |
| 6,474,100 B1 | 11/2002 | Smith et al. | |
| 6,532,762 B2 | 3/2003 | Smith et al. | |
| 6,565,009 B2 | 5/2003 | Yano et al. | |
| 6,655,601 B2 | 12/2003 | Yano et al. | |
| 6,840,994 B2 | 1/2005 | Krowl et al. | |
| 6,848,624 B2 | 2/2005 | Dianetti et al. | |
| 2002/0023461 A1 * | 2/2002 | Minowa et al. | 62/527 |

FOREIGN PATENT DOCUMENTS

| | | | |
|---|---|---|---|
| JP | 05058702 A * | 3/1993 | |
| JP | 2001151506 A * | 6/2001 | |

OTHER PUBLICATIONS

Shaw et al.; "In situ Synchrotron Studies of Hydrated Calcium Silicate Dehydration and Recrystallization"; Science Reports; Ceramics, Glasses & Amorphous Materials; 2 pages; Date Unknown.

Allen et al.; "USAXS studies of calcium-silicate-hydrate gel in cement"; Ceramics Division, NIST, McCormick School of Engineering, Northwestern University; 3 pages; Date Unknown.

Shaw et al.; "Dehydration/recrystallization mechanisms, energetics, and kinetics of hydrated calcium silicate minerals: an in situ TGA/DSC and synchrotron radiation SAXS/WAXS study"; Chemical Geology 167; 2000; pp. 141-159.

Ibanez et al; "Producing Synthetic Wollastonite by Autoclaving"; Institute for Ceramics and Glass; Sep. 1998.

* cited by examiner

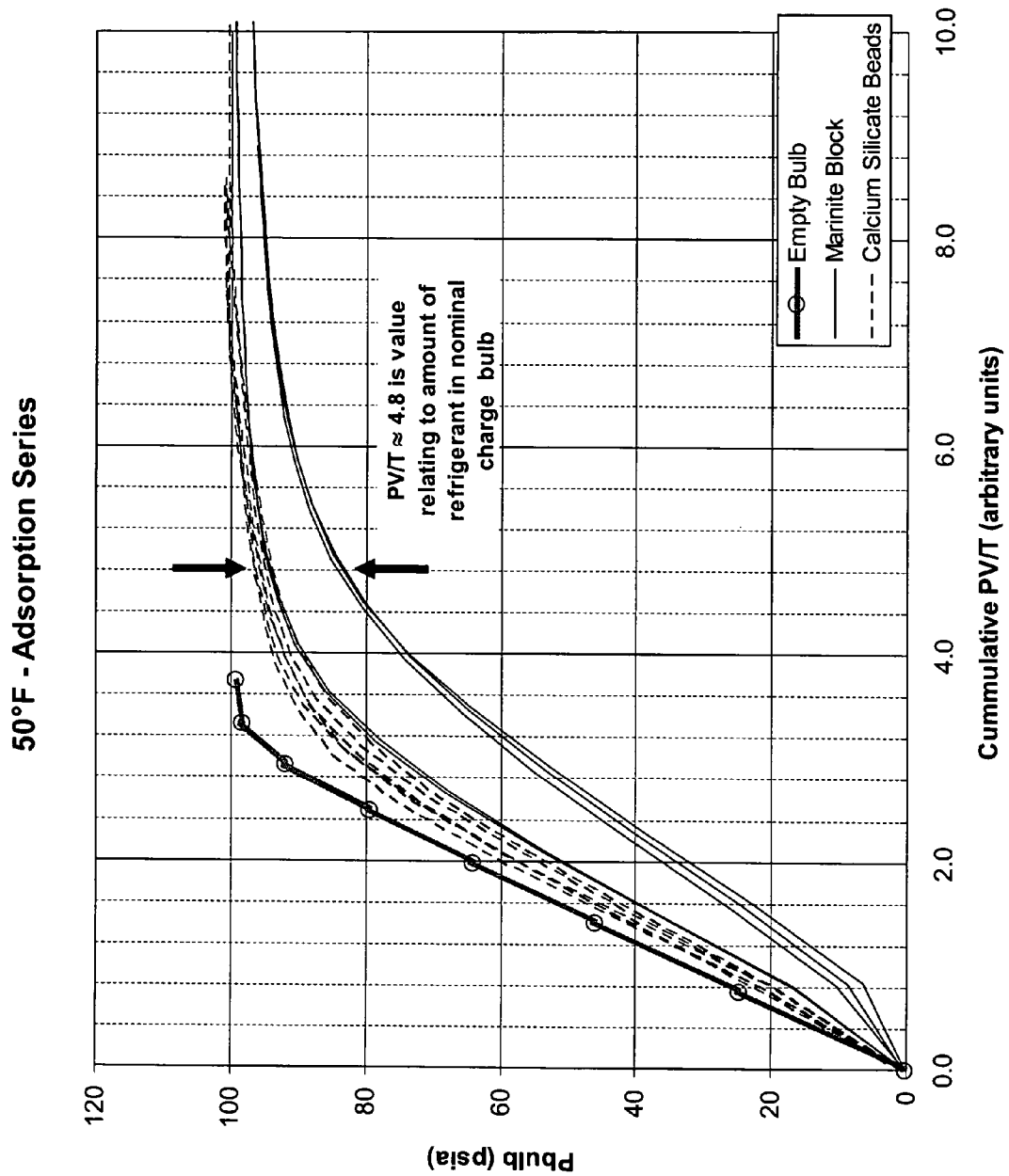

CALCIUM SILICATE HYDRATE MATERIAL FOR USE AS BALLAST IN THERMOSTATIC EXPANSION VALVE

RELATED APPLICATION

This application claims the benefit of U.S. Provisional Application No. 60/653,687 filed 17 Feb. 2005, which is hereby incorporated herein by reference in its entirety.

TECHNICAL FIELD

The present invention relates generally to improved ballast material for a thermostatic expansion valve as employed in refrigeration systems, particularly of the compressor-condenser-evaporator type. More particularly, the present invention relates to an improved form of calcium silicate hydrate for use as ballast in such thermostatic expansion valve.

BACKGROUND

A long-standing problem in the refrigeration arts is the "hunting" phenomenon, which is the excessive cycling of thermostatic control valves in response to transient changes in the refrigeration system. A refrigeration system generally includes a thermostatic expansion valve and a thermal sensing bulb. The thermal sensing valve is located in a position selected to provide feedback information about the thermal condition of the system which is used by the thermal expansion valve to make changes in refrigerant flow to effect changes in the thermal condition of the system. In general, a thermal sensing bulb communicates with the thermostatic expansion valve by means of a working fluid which expands or contracts with temperature changes experienced by the thermal sensing bulb and thereby affects operation of the thermostatic expansion valve. The hunting phenomenon occurs when the working fluid is, in effect, overly sensitive, resulting in rapidly fluctuating changes being communicated to the thermostatic expansion valve. In the prior art, many attempts have been made to reduce the sensitivity of the working fluid while maintaining adequate thermal control. In general, these attempts have included the use of materials that form a ballast or buffer generally located in the thermal sensing bulb, to attenuate rapid changes in the working fluid due to transient changes in the thermal condition of the system.

The assignee of the present invention has used with some success a thermostatic expansion valve and a thermal sensing bulb in which the thermal sensing bulb is provided with a single block of a material normally used as a thermal insulating board in sheet form. The sheet material is described in U.S. Pat. No. 4,128,434, the disclosure of which is incorporated herein by reference. The '434 patent describes the manufacture of the material in large sheet form (e.g., 4'×8' 122 cm.×244 cm.) for the construction industry, in which the material is used as a thermal insulation material, e.g., in walls, floors or ceilings of structures. In the assignee's previous thermal sensing bulbs, single blocks of this material are cut from such boards and one such block is inserted as a single piece into the thermal sensing bulb and forms the ballast. The block of thermal insulation material acts as a ballast for the working fluid, when the bulb is operatively attached to an appropriate thermostatic expansion valve. The material in the '434 patent is described as a thermal insulation body formed of a tobermorite calcium silicate reinforced with wollastonite. The '434 patent discloses various methods for making the sheet material. Such sheet material is available commercially under the trademark MARINITE® from BNZ Materials, Inc., Littleton, Colo.

The success had with this system has been tempered by the recurring and previously unsolved problems of variations in the material both from sheet to sheet and within a single sheet and of variations between the single blocks cut from such sheets. That is, some sheets have different thicknesses within a single sheet and compared to other, ostensibly identical sheets. Other sheets have variations in the structure of the material itself on either the macro- or micro-scale, such as differences in porosity, hardness, durability, etc. Variations also arise from differences in cutting of the individual blocks of insulation material. These variations, while not detrimental to the thermal insulation function for which the panels were designed, have resulted in problems of non-uniform operation between otherwise identical thermal expansion valves including thermal sensing bulbs using this material as ballast. Such variation in operation is undesirable for a variety of reasons, known in the art.

Other materials have been suggested for use as the ballast material in such thermal sensing bulbs used with thermostatic expansion valves. Activated carbon is one such material, sought for its porosity and adsorption characteristics. The activated carbon is used due to its controllable pore size for controlling adsorption of the working fluid. This material has its own problems, including small particle sizes, formation of fines due to breakage of the particles, and changes in adsorption due to contaminants in the working fluid. These problems manifest themselves in poor performance or performance varying with time as the adsorption characteristics change.

Thus, there is a continuing and unmet need for improved materials for use in thermal sensing units for use with expansion valves such as thermostatic expansion valves.

SUMMARY

The present invention provides an improved thermal sensing bulb for an expansion valve that contains a ballast material including a plurality of particles that include a calcium silicate hydrate.

According to another embodiment, a refrigeration system comprises a thermostatic expansion valve including a thermal sensing bulb, wherein the thermal sensing bulb contains a working fluid sealed inside the thermal sensing bulb and in operative communication with said expansion valve. A ballast in the thermal sensing bulb includes a plurality of particles including a calcium silicate hydrate.

According to a further aspect of the invention, there is provided a process for manufacturing a thermal sensing bulb for an expansion valve. The process comprises the steps of providing a thermal sensing bulb for operative connection with an expansion valve; and placing into the thermal sensing bulb a plurality of particles including a calcium silicate hydrate.

According to still another aspect of the invention, a process for manufacturing a thermal sensing bulb for a thermostatic expansion valve, comprises the steps of providing a thermostatic expansion valve body; providing a thermal sensing bulb for use with the thermostatic expansion valve; combining ingredients comprising a silica component with a calcium source under conditions to form a plurality of particles including the calcium silicate hydrate; placing a plurality of the particles into the thermal sensing bulb; providing a working fluid for operative communication between the thermal sensing bulb and the thermostatic expansion valve; and sealing the working fluid in a space defined by the interior space of the thermal sensing bulb, a working space in the thermostatic expansion valve, and a communication channel between said thermal sensing bulb and said working space.

The foregoing and other aspects and features of the invention are hereinafter described with reference to the accompanying drawings.

BRIEF DESCRIPTION OF THE DRAWINGS

FIG. 2 is a graph showing results of tests of the adsorption characteristics of a prior art ballast material and a ballast material comprising particles including a calcium silicate hydrate in accordance with an embodiment of the present invention.

DETAILED DESCRIPTION

Figure 1:
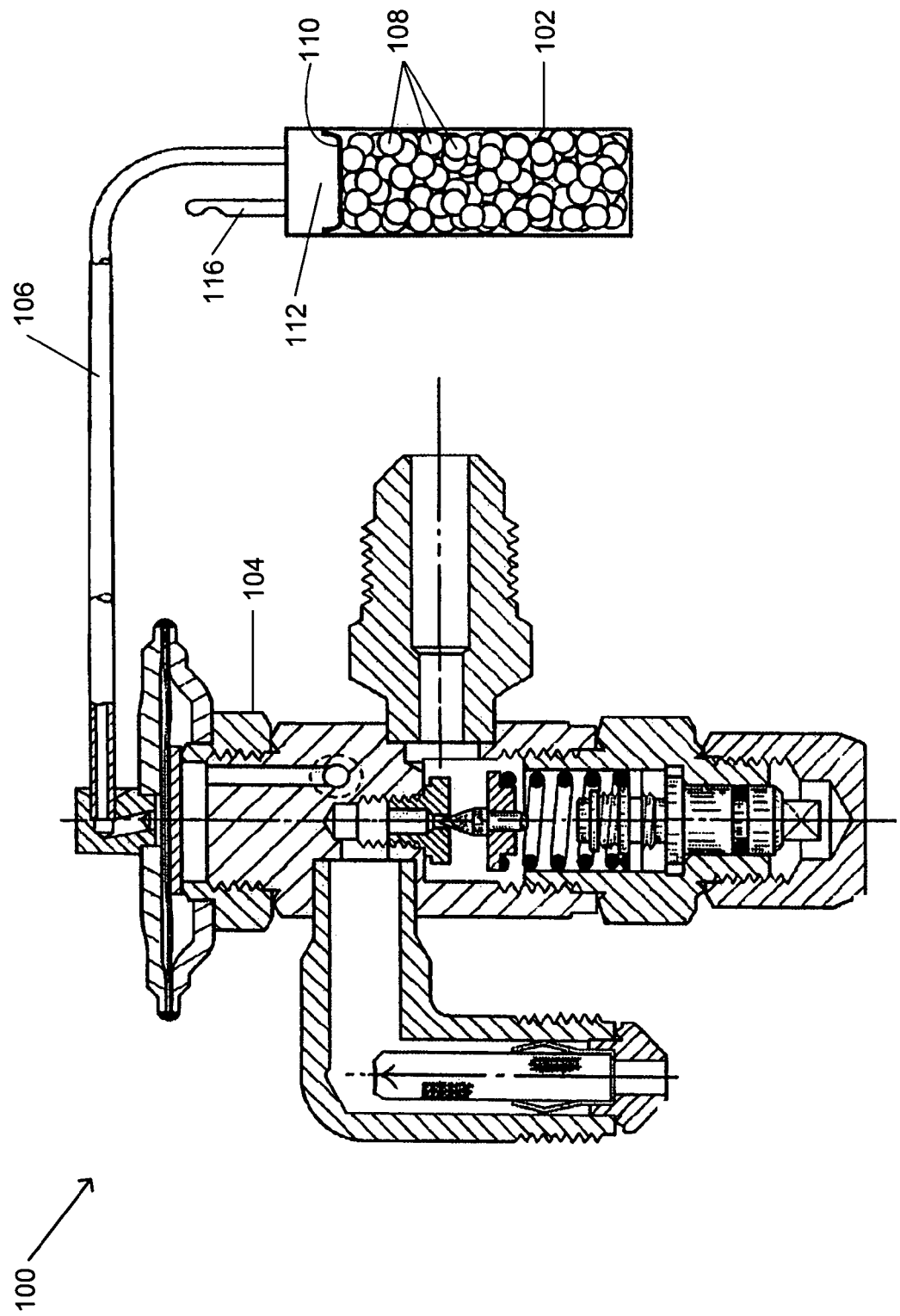
FIG. 1 is a cross-sectional view of an exemplary thermostatic expansion valve including a thermal sensing bulb and particles including a calcium silicate hydrate in accordance with the present invention.

As used herein, calcium silicate hydrate may include any crystalline form of calcium silicate hydrate, of which many are known, unless specific reference to specific crystalline forms of calcium silicate hydrate is made. Such crystalline forms include, for example, tobermorite, xonotlite, hillebrandite, wollastonite, foshagite, jennite, any other crystalline form of calcium silicate hydrate, mixtures and combinations and sub-types of these. For example, tobermorite can exist in at least three different forms or sub-types and, since various of these crystalline forms can be transformed into other crystalline forms of calcium silicate by application of heat, mixtures and combinations of these crystalline forms may be present. The only limitation to a specific crystalline form herein is when a specific crystalline form is mentioned, that specific crystalline form must be present, although even the specific crystalline form mentioned nevertheless may include other crystalline forms as well.

The particles including a calcium silicate hydrate may be substantially uniform in one or more of adsorption character, density, particle physical size, particle shape and particle weight. The substantially uniform feature can provide a substantially uniform ballast function in the thermal sensing bulb and thereby provides for improved control of operation of the expansion valve with which the thermal sensing bulb is employed.

The overall adsorption character of the ballast in the thermal sensing bulb preferably should be substantially uniform, so that the function of each thermal sensing bulb can be made to be the same. As used herein, a substantially uniform adsorption characteristic means that the equilibrium pressure for a constant quantity of refrigerant introduced as the ballast in a thermal sensing bulb at a constant temperature varies by no more than ±5% for a given quantity of the particles including a calcium silicate hydrate in accordance with the present invention. The goal of obtaining a substantially uniform adsorption characteristic is more easily obtained when the particles are substantially uniform in physical characteristics, such as density, surface area, shape and weight.

As used herein, "substantially uniform density" when used in reference to the density of the particles including a calcium silicate hydrate, means that the particles do not differ by more than about ±10% in density. More preferably, the particles do not differ by more than about ±5% in density, and still more preferably the particles do not differ by more than about ±2% in density. Thus, for example (at ±10%), a substantially uniform density, if the average density is about 2.5 g/cc, a range of ±10% would include densities ranging from about 2.25 to about 2.75 g/cc. Similar considerations apply to weight, i.e., a substantially uniform weight should not differ by more than about ±10% in weight, although more preferably the particles do not differ by more than about ±5% in weight, and still more preferably do not differ by more than about ±2% in weight for improved function.

A substantially uniform shape means that the particles are all generally of the same shape, i.e., substantially spherical, substantially cylindrical, or other regular shape. Small differences in shape, such as a slightly ovoid spherical shape, or a cylindrical shape that has a slight bulge at the longitudinal center or that has slightly rounded edges at the ends, fall within the definition of substantially uniform shape.

It is noted that the numerical limits of the disclosed ranges may be combined, and are considered to include disclosure of intermediate values between the specifically disclosed numerical limits.

The quantity of particles including a calcium silicate hydrate used in a ballast may be controlled within about ±0.2 gm for a total quantity of 5 gm of the particles in a bulb (i.e., ±4%). With the prior art system using an insulation board cut into blocks having a desired target weight of 5 gm, the variation could be as great as ±1 gm, i.e., a difference of about ±20%. This variation could result in a variation in the adsorption characteristic in the range of ±15%. Thus, the present invention enables a significant increase in controllability of the quantity of ballast material used in the thermal sensing bulb and a significant improvement in the uniformity of the adsorption characteristic and thus a significant improvement in uniformity in function of the bulbs. Determination of adsorption characteristic is described in detail below.

The improved uniformity of the adsorption characteristic results in more uniform function of the thermal sensing bulb, and this improvement has a number of beneficial effects in the thermostatic expansion valve manufacturing process. With more uniformly functioning thermal sensing bulbs, adjustments needed on individual expansion valves to which the thermal sensing bulbs are connected can be reduced, saving manufacturing time and costs, manufacturing tolerances on parts used in the expansion valves can be tightened, thus improving long-term performance and lifetime of the expansion valve, and the overall lifetime of the expansion valves can be improved due to more stable operation with the hunting phenomenon thus further suppressed.

Due to the uniformity of the particles and the elimination of the need to cut individually every single block used in every single thermal sensing bulb, the cost of the ballast material for an individual bulb may be reduced by a factor of about 4. That is, the cost of using the particles including calcium silicate hydrate of the present invention may be about 25% of the cost of using the single block of insulation material previously used. Thus, the present invention enables a significant decrease in cost of ballast material used in the thermal sensing bulb made in accordance with the present invention.

As above indicated, the present invention provides a thermal sensing bulb for an expansion valve, the bulb containing a ballast material, the ballast material including a plurality of particles including a calcium silicate hydrate. The calcium silicate hydrate may be in any crystalline form. The particles including a calcium silicate hydrate may include crystalline forms of calcium silicate hydrate such as tobermorite, xonotlite, hillebrandite, wollastonite, foshagite, jennite, any other crystalline form of calcium silicate, mixtures and combinations and sub-types of these. The particles including a calcium silicate hydrate may include tobermorite, xonotlite and wollastonite in combination. The wollastonite may function as a binder for the particles, as a filler, both a binder and a filler, or simply as a filler or binder. In another embodiment, the wollastonite is present and functions as a binder for the particles, as a filler and as an adsorbent together with any other form(s) of calcium silicate hydrate present.

The calcium silicate hydrate of the particles may comprise a major portion of xonotlite based on the total amount of calcium silicate hydrate. In another embodiment, the calcium silicate hydrate of the particles may comprise a major portion of xonotlite based on the total weight of the particles. In yet another embodiment, the calcium silicate hydrate may comprise a major portion of xonotlite based on the total amount of calcium silicate hydrate other than (i.e., exclusive of) any amount of wollastonite present.

The calcium silicate hydrate of the particles may comprise a major portion of tobermorite based on the total amount of calcium silicate hydrate. In another embodiment, the calcium silicate hydrate of the particles may comprise a major portion of tobermorite based on the total weight of the particles. In yet another embodiment, the calcium silicate hydrate may comprise a major portion of tobermorite based on the total amount of calcium silicate hydrate other than (i.e., exclusive of) any amount of wollastonite present.

The wollastonite may act as an "active filler", in which the wollastonite has an effect on the adsorption characteristic, but the effect may be weaker than the effect of other crystalline forms of calcium silicate hydrate.

The particles including a calcium silicate hydrate of the present invention, when placed into the temperature sensing bulb of an expansion valve assembly as described herein, are believed to function by releasably adsorbing a portion of the working fluid onto exposed surfaces of the particles. The surface area of the particles described herein is very high, and the surfaces include a number of capillary-like passages and openings, which are believed also to acquire and releasably hold a portion of the working fluid when used as described herein. By the action of releasably adsorbing and releasably holding in capillaries the working fluid, the thermal sensing bulb incorporating the particles of the present invention is able to provide the desired thermal sensing function while avoiding the "hunting" phenomenon. Although not to be bound by theory, it is considered that the adsorbed and held working fluid requires either or both of extra energy input and extra time to be released from the particles, and conversely, either or both of extra energy lost or dissipated and extra time for the working fluid to be reacquired by the particles. Both the extra energy and the extra time result in delays in the change of pressure in the working fluid which is used to transmit to the expansion valve the change in condition sensed by the thermal sensing bulb, thus avoiding "hunting". The present invention provides an improvement in this function due to the improved uniformity of the particles including a calcium silicate hydrate and the improved control in the quantity (by, e.g., controlling the number) of the particles including calcium silicate hydrate included in each thermal sensing bulb.

The particles may include a calcium silicate hydrate further include a binder and/or a filler. The binder may include a wide variety of materials useful for helping to bind together the particles including, as noted above, wollastonite. Other binder materials include, but are not limited to, Kraft fiber or paper, organic fibers such as cotton or synthetic polymers such as polyester, perlite, mineral wool (also known as rock or slag wool), glass fiber, aluminum oxide, or any of a number of materials available from 3M, including, for example, Z-Light Spheres®. Other suitable binder materials may be used.

The binder may be present in the particles in an amount ranging from about 1 to about 50 wt %, or from about 2 to about 25 wt %, or from about 5 to about 15 wt %, based on the total weight of the particles.

The particles may including a calcium silicate hydrate may further include one or more fillers. The filler(s) may be present in addition to a binder, or a material, such as wollastonite, may function as both a binder and a filler.

Suitable filler materials include, in addition to the binder materials mentioned above, materials such as glass, wool felt, river gravel, or calcined aluminum oxide (e.g., aluminum oxide fired at temperatures of about 1000 °C. or higher). The filler may be in any suitable form, e.g., particles or fibers.

The filler may be present in the particles in an amount ranging from about 1 to about 22 wt %, or from about 2 to about 10 wt %, based on the total weight of the particles. As noted, a given material may act as both binder and filler, and if so, the total content may be as set forth above for the binder.

The particles including a calcium silicate hydrate may be made by a variety of known methods modified, for example, as disclosed herein to form particles rather than sheets or other large structures. In one embodiment, the particles including a calcium silicate hydrate may be made by a process such as that disclosed in U.S. Pat. No. 4,128,434, which has been incorporated herein by reference. The process of making the particles in accordance with the present invention may be substantially similar to that disclosed in the '434 patent, except that the product is formed into particles as described herein instead of sheet form as described therein. Since the strength requirements of the particles of the present invention are much less than that of the sheet structures formed by the '434 patent, the high pressures taught in the '434 patent may not be necessary in the present invention.

Another significant difference from the '434 patent is that the calcium silicate hydrate need not be in the tobermorite crystalline form as required by the '434 patent. In fact, as disclosed herein, the calcium silicate hydrate of the present invention is not limited to the tobermorite structure.

Furthermore, the wollastonite taught to be critical in the '434 patent is not critical to the present invention. When the wollastonite is present in the particles of the present invention, it is not necessarily required to be present in the range of 15 to 40 parts by weight as required in the '434 patent. That is, the particles may include less than 15 parts by weight wollastonite or may include greater than 40 parts by weight wollastonite. Of course, in other embodiments, the particles of the present invention may include an amount of wollastonite in the range from 15 to 40 parts by weight of wollastonite.

The particles including a calcium silicate hydrate of the present invention may be made by reacting a calcium source, such as lime (CaO, calcium oxide) or hydrated or slaked lime Ca(OH)$_2$, or calcite (CaCO$_3$), with a silicon source (referred to as a silica), such as silicon dioxide, SiO$_2$, which may be provided in the form of diatomaceous earth, diatomite or a similar siliceous component.

The ratio of lime to silica may range from about 0.5 to about 2 parts lime to one part silica. Thus, the initial Ca:Si ratio may range from about 1:2 to 2:1. It is noted, for example, that the Ca:Si ratio in tobermorite is 5:6, the Ca:Si ratio in xonotlite is 6:6, the Ca:Si ratio in hillebrandite is 6:3, the Ca:Si ratio in wollastonite is 1:1, and the Ca:Si ratio on foshagite is 4:3.

The overall reaction between the lime and silica, if water is ignored and if the reaction occurs at sufficiently elevated temperature, can be generalized as:

$$CaO + SiO_2 \rightarrow CaSiO_3$$

in which the Ca:Si ratio is 1:1. However, the lime is normally at least to some degree hydrated and the reaction is usually carried out on a slurry of the calcium and silica reactants at various ratios depending on the desired product. Water is almost always a significant component of the reaction and the product of the reaction may be any one or various combinations of the many forms of calcium silicate hydrate, depending on the ratios of reactants and on the conditions of pressure and heat applied during and subsequent to the reaction of lime and silica reactants.

In the process described in the '434 patent, a slurry containing lime, silica, wollastonite and any filler/binders, are provided to a molding machine, such as a press mold at a pressure of about 450 psig (3 MPa), to form the reactants into a sheet. This sheet is then placed in an indurating unit, such as an autoclave, where it is cured in the presence of high pressure saturated steam to cause the lime to react with the silica to form a tobermorite calcium silicate hydrate matrix. Minimum parameters disclosed in the '434 patent include 8 hours in saturated steam at 100 psig (3380°F. (170°C.); 6.8 atm. gauge (689 kPa)). The '434 patent teaches that higher pressures and temperatures, e.g., saturated steam at 200 psig (1379 KPa), and extended times, e.g., 20 hours, result in the formation of xonotlite.

According to an embodiment of the present invention, particles of a precursor mixture of the calcium silicate hydrate are first formed in a pin mixer. This type mixer uses a feed of the dry ingredients, i.e., lime, silica, binders and/or fillers, to which sufficient water is added to form the desired particles. The pin mixer produces relatively dense particles with relatively few voids and with a water content as needed to form the particles into a strong mass even in the green state. The particle size can be selected and controlled based on factors such as the water mass flow, the dry feed rate, the distance between the end of the pins and the walls of the pin mixer, and the residence time the precursor material is in the mixer. The pressures applied to the nascent particles in the pin mixer may be substantially less than those disclosed in the '434 patent as applied to the sheet materials prepared there. In another embodiment the pressures applied substantially may be similar, and in another may be greater than those disclosed in the '434 patent for application in forming the sheet materials.

In another embodiment, particles of a precursor mixture of the calcium silicate hydrate are first formed in a disc or pan mixer, in which the dry components are added simultaneously with a water spray to begin forming the particles. This type mixer uses a dry feed of the ingredients, i.e., lime, silica, binders and/or fillers, produces somewhat less dense particles than does the pin mixer. The particle size can be selected and controlled primarily based on residence time in the disc or pan mixer. In this embodiment, the nascent particles are not subjected to high pressures, such as those in the '434 patent for forming the sheets therein.

In an embodiment of the present invention, the particles of the calcium silicate hydrate can be prepared from a slurry in an extruder. In this embodiment, the water, dry materials including the calcium silicate precursors, binders, fillers, etc. are combined and mixed into a slurry in the extruder and are formed into substantially cylindrical pellets by the extrusion die in this process.

Following formation of the precursor particles in the pin mixer or the disc mixer (or as otherwise formed), the particles are autoclaved to form the particles including a calcium silicate hydrate. The autoclaving conditions include, for example, exposure to saturated steam at gauge pressures, for example, ranging from about 10 psig (about 69 kPa) to about 200 psig (about 1379 kPa), and in one embodiment, from about 25 psig (about 172 kPa) to about 175 psig (about 1207 KPa). The temperatures associated with these autoclave pressures are known. The time in the autoclave may range from about 1 hour to about 48 hours, or in one embodiment, from about 2 to about 24 hours. The time, temperature and pressure may be suitably selected to obtain the desired form of crystals of the calcium silicate hydrate.

A process such as the following example may be used to prepare particles including a calcium silicate hydrate in accordance with the present invention. The dry ingredients are combined and mixed well. The combined and mixed dry ingredients are fed into a pin mixer with a water supply. The dry feed, the water feed, and the pin mixer speed are controlled to obtain a desired nominal particle size. The beads thus produced are collected and sieved to obtain the desired final particle size. The sieve step may be done after the autoclave steps, or may not be needed at all. The beads are next placed on trays and are wetted the beads and/or the beads are placed on trays with water, and the trays are stacked in the autoclave. The beads are cured into particles including a calcium silicate hydrate in the autoclave. The autoclaving pressure may range from about 10 to about 200, or from about 20 to about 175 psig saturated steam, for a time ranging from about 2 to about 24 hrs. The particles are removed from autoclave, and any free water is removed from the trays. The trays are next placed in a drying oven, at a temperature ranging from about 65°C. to about 150°C., for a time of about 4 to about 24 hr. Thereafter, the particles including a calcium silicate hydrate are stored in an air tight container or in a dry room until used.

In one embodiment, the plurality of particles including a calcium silicate hydrate used in any given thermal sensing bulb may range from about 10 to about 10,000 said particles. Higher numbers of particles may be used if the particle size is relatively small. In one embodiment, the number of particles may range from about 50 to about 1000, or from about 100 to about 600. In one embodiment, there are about 350 to about 450 particles in the thermal sensing bulb. It is desirable to have a particle count in these ranges to obtain good uniformity from bulb to bulb. That is, if there are variations between individual particles, these variations are averaged out better with an increased number of particles.

In one embodiment, the particles including a calcium silicate hydrate have an average particle size ranging from about 0.1 to about 10 mm. In another embodiment, the particle size ranges from about 1 to about 5 mm, and in another embodiment from about 2 to about 3 mm. The particle size is not critical, although it is helpful to have particles in these size ranges for ease of handling and use, and so that a uniform quantity of ballast comprising the calcium silicate hydrate can be used in each thermal sensing bulb. The ability to accurately control the quantity of ballast placed in each thermal sensing bulb is one of the significant benefits obtained by the present invention, and obtaining a controllably uniform particle size helps to attain this benefit.

In one embodiment, the particles including a calcium silicate hydrate in accordance with the present invention are selected by size by selecting and using particles that pass through a standard U.S. 4 mesh screen but that do not pass through a standard U.S. 15 mesh screen. In another embodiment, the particles including a calcium silicate hydrate in accordance with the present invention are selected by size by selecting and using particles that pass through a standard U.S. 8 mesh screen but that do not pass through a standard U.S. 11 mesh screen.

In one embodiment, the particles are substantially spherical in shape. In another embodiment, the particles range from substantially spherical to ellipsoid and/or ovoid in shape. The particles may have other shapes as well. Particles having a relatively smooth surface generally provide better flowability and enhance the ease of use in filling the thermal sensing bulb of the invention.

As described above, the particles including a calcium silicate hydrate are used in a thermal sensing bulb for an expansion valve, such as a thermostatic expansion valve. The thermostatic expansion valve may be used, for example, in a refrigeration system. As used herein, "refrigeration system" includes any system which relies upon compression and expansion of a working fluid to obtain cooling.

Thus, one aspect of the present invention relates to a refrigeration system including a thermostatic expansion valve, the expansion valve including a thermal sensing bulb, the thermal sensing bulb comprising a working fluid, the working fluid sealed inside the thermal sensing bulb and in operative communication with the expansion valve; and a ballast in the thermal sensing bulb, the ballast including a plurality of particles including a calcium silicate hydrate.

FIG. 1 is a cross-sectional view of an exemplary thermostatic expansion valve 100 including a thermal sensing bulb 102 in accordance with the present invention. The thermostatic expansion valve 100 includes a valve body such as the exemplary valve body 104 illustrated in FIG. 1, the thermal sensing bulb 102, and a channel or tube 106 operatively connecting the valve body 104 to the thermal sensing bulb 102. The thermal sensing bulb 102 contains a ballast material. In accordance with the present invention, the thermal sensing bulb 102 contains a ballast material comprising a plurality of particles 108 including a calcium silicate hydrate, as described herein above. In the illustrated embodiment, the particles 108 are retained in the thermal sensing bulb 102 by a screen or similar device 110. While this is illustrated, other means known in the art may be used for retaining the particles 108 in the bulb 102. The exact number or quantity of the particles 108 placed in the bulb may be suitably determined by the person of ordinary skill in the art based on the particular design of the thermal sensing bulb 102 and the thermal expansion valve with which it is used.

The particles 108 in the bulb 102 define an inter-particle space surrounding the particles. Generally, a head space 112 is defined above the level of particles retained by the screen 110 in the thermal sensing bulb 102. This inter-particle space and the head space 112 are in fluid communication with an inner volume 106a of the tube 106 and with a working space 114 in the expansion valve 100.

The bulb 102 may include a filling nipple 116. A working fluid, such as a fluorocarbon, is placed into the inter-particle space, the head space 112, the inner volume 106a and the working space 114 by, for example, using the filling nipple 116 to introduce the working fluid and thereafter sealing the nipple 116 to provide a closed system for the working fluid. Other methods as may be known in the art for introducing the working fluid into the thermal sensing bulb may be used.

Suitable working fluids include any material known for such use. These materials include, in the prior art, ammonia and various CFCs, and today include many known replacements for the environmentally undesirable CFCs and HCFCs, including, e.g., R12 and R22. Suitable working fluids for the thermal sensing bulb include the standard refrigerants and gases such as carbon dioxide, propane, R22 and any of the many known HFCs such as R410a.

The working fluid in the thermal sensing bulb may have properties substantially similar to the properties of the primary refrigerant working fluid. A suitable working fluid may be selected by the person of ordinary skill in the art, depending on the particular system with which the thermostatic expansion valve is used. The working fluid may be the same as or different from the refrigerant used in the refrigeration system.

As is known, in operation, the working fluid transmits temperature change information in the form of pressure changes in the working fluid from the thermal sensing bulb 102 through the interior space 106a of the tube 106 and the working space 114 to actuate, for example, a diaphragm or other pressure sensor in the thermostatic expansion valve 100. The details of operation of expansion valves such as thermostatic expansion valves are well known are need not be repeated here.

According to the present invention, the ballast includes the plurality of particles including a calcium silicate hydrate. The particles releasably adsorb the working fluid and release the working fluid depending on temperature changes experienced by the thermal sensing bulb. The plurality of particles including a calcium silicate hydrate allow the manufacturer of the thermal sensing bulb to provide a much improved uniformity of response to thermal changes, compared to prior art bulbs containing other ballast materials made of other materials and/or having a non-particulate form (such as the single block of material described above).

The present invention further provides a process for manufacturing a thermal sensing bulb, e.g., the bulb 102, for an expansion valve, including providing a thermal sensing bulb 102 for operative connection with an expansion valve 104; and placing into the thermal sensing bulb 102 a plurality of particles 108 comprising a calcium silicate hydrate. Following the filling of the bulb 102 with the plurality of particles 108, the bulb may be connected operatively to an expansion valve 100 such as a thermostatic expansion valve, by using a tube 106 such as that described above. The process for manufacturing the bulb for an expansion valve may further include providing a working fluid in the thermal sensing bulb 102 for operative communication between the thermal sensing bulb 102 and the expansion valve 100. As described above, the working fluid may be provided to the spaces defined by the bulb, the inter-particle space and the interior space 106a of the tube 106 connecting the bulb 102 to the expansion valve 100. The process of providing the working fluid may further include sealing the working fluid in the spaces so defined. As described above, the working fluid may be generally sealed within the working space so that it can provide a long-term consistent communication from the thermal sensing bulb to the expansion valve.

Thus, in one embodiment, the present invention further relates to a process for manufacturing a thermal sensing bulb for a thermostatic expansion valve, including providing a thermostatic expansion valve body; providing a thermal sensing bulb for use with the thermostatic expansion valve; combining ingredients comprising a silica component with a calcium source under conditions to form a plurality of particles including the calcium silicate hydrate; placing a plurality of the particles into the thermal sensing bulb; providing a working fluid for operative communication between the thermal sensing bulb and the thermostatic expansion valve; and sealing the working fluid in a space defined by the interior space of the thermal sensing bulb, a working space in the thermostatic expansion valve, and a communication channel between said thermal sensing bulb and said working space.

Adsorption Characteristic Test

The "adsorption characteristic" discussed with respect to the present is a technique developed by the inventor to measure the characteristics of the ballast material used in thermal sensing bulbs, including both those of the prior art and of the present invention. The adsorption characteristic has been found to reflect accurately the uniformity of function of thermal sensing bulbs.

Apparatus:

A pressure transducer is connected via 1/16" diameter capillary tube to a copper bulb with a removable top. The copper bulb contains the ballast sample to be characterized. The pressure transducer/bulb assembly is kept at a constant temperature in an environmental chamber during the test run. A gas-tight piston assembly is located outside the chamber, and is mounted to an isothermal block maintained at an elevated temperature, well above the saturation temperature of the gas (working fluid) being used. The gas tight piston is connected to a refrigerant source maintained at a constant pressure. The gas tight piston is of fixed volume. The piston assembly is connected via series of directional control valves to the bulb assembly located inside the chamber.

Test:

The test begins by completely evacuating the air from the pressure transducer/bulb assembly. Next, the piston is filled with superheated refrigerant gas (working fluid) at a fixed temperature, pressure, and volume. The quantity of gas is approximately 1/8th of the nominal quantity found in a similar standard sensing bulb charge. The contents of the piston are then injected into the pressure transducer/bulb assembly, and the assembly allowed time to stabilize before the pressure is recorded. After the pressure is recorded, the piston is refilled with another dose of refrigerant gas, and this process repeated until the pressure transducer indicates a saturated state for the refrigerant gas at the chamber temperature.

EXAMPLES

In the following Examples, particles including a calcium silicate hydrate (referred to here as "beads") in accordance with an embodiment of the present invention are tested against an empty bulb and prior art MARINITE® blocks in the absorption characteristic test described above. The particles including a calcium silicate hydrate used in these examples are prepared according to the procedure outlined above in a pin mixer, and are prepared from a formulation of ingredients substantially the same as that disclosed in U.S. Pat. No. 4,128,434. All of the particles including a calcium silicate hydrate were autoclaved at 130-150° C. for 6 hours and dried at 90° C. prior to use. In the following, "Cum. PV/T" is the cumulative quantity of working fluid injected into the system, and "$P_{bulb}$" is the resulting pressure. In all Examples and Comparative Examples, 4.6±0.1 g of ballast material of the indicated type was placed in each bulb and the working fluid is R22 refrigerant. The highlighted rows represent charge number nine, which is the closest sample to the normal loading of working fluid that would be used in a working thermal sensing bulb. The results of the tests are plotted in the graph shown in FIG. 2.

| Example 1 Calcium Silicate Beads 060126-01 | | Example 2 Calcium Silicate Beads 060130-01 | | Example 3 Calcium Silicate Beads 060130-01 | |
|---|---|---|---|---|---|
| Cum. PV/T | $P_{bulb}$ | Cum. PV/T | $P_{bulb}$ | Cum. PV/T | $P_{bulb}$ |
| 0.000 | 0.35 | 0.000 | 0.37 | 0.000 | 0.36 |
| 0.780 | 18.75 | 0.780 | 18.61 | 0.778 | 19.08 |
| 1.469 | 38.48 | 1.473 | 37.72 | 1.465 | 39.02 |

-continued

| | | | | | |
|---|---|---|---|---|---|
| 2.079 | 55.51 | 2.088 | 54.40 | 2.071 | 56.42 |
| 2.627 | 69.09 | 2.642 | 67.84 | 2.613 | 70.31 |
| 3.129 | 79.07 | 3.150 | 77.96 | 3.109 | 80.53 |
| 3.601 | 85.63 | 3.624 | 84.97 | 3.574 | 87.21 |
| 4.055 | 89.64 | 4.079 | 89.40 | 4.020 | 91.16 |
| 4.496 | 92.24 | 4.521 | 92.17 | 4.456 | 93.51 |
| 4.929 | 94.07 | 4.954 | 93.98 | 4.884 | 95.05 |
| 5.357 | 95.39 | 5.382 | 95.25 | 5.308 | 96.13 |
| 5.779 | 96.46 | 5.805 | 96.20 | 5.728 | 96.94 |
| 6.197 | 97.31 | 6.225 | 97.01 | 6.145 | 97.62 |
| 6.612 | 98.04 | 6.641 | 97.72 | 6.559 | 98.25 |
| 7.024 | 98.68 | 7.055 | 98.37 | 6.970 | 98.84 |
| 7.433 | 99.25 | 7.465 | 99.07 | 7.378 | 99.46 |
| 7.840 | 99.72 | 7.872 | 99.69 | 7.784 | 100.04 |
| 8.246 | 99.96 | 8.277 | 100.13 | 8.187 | 100.46 |
| 8.651 | 100.1 | 8.682 | 100.33 | 8.590 | 100.61 |
| 9.056 | 100.15 | | | | |
| 9.461 | 100.18 | | | | |
| 9.866 | 100.20 | | | | |
| 10.271 | 100.22 | | | | |
| 10.676 | 100.23 | | | | |
| 11.081 | 100.24 | | | | |
| 11.485 | 100.27 | | | | |

| Example 4 Calcium Silicate Beads 060130-01 | | Example 5 Calcium Silicate Beads 060201-02 | | Example 6 Calcium Silicate Beads 060201-01 | |
|---|---|---|---|---|---|
| Cum. PV/T | $P_{bulb}$ | Cum. PV/T | $P_{bulb}$ | Cum. PV/T | $P_{bulb}$ |
| 0.000 | 0.36 | 0.000 | 0.37 | 0.000 | 0.39 |
| 0.779 | 18.90 | 0.767 | 21.51 | 0.770 | 20.81 |
| 1.467 | 38.64 | 1.442 | 41.54 | 1.445 | 41.52 |
| 2.076 | 55.79 | 2.038 | 58.56 | 2.039 | 59.17 |
| 2.623 | 69.50 | 2.573 | 72.05 | 2.569 | 73.06 |
| 3.122 | 79.65 | 3.062 | 81.91 | 3.052 | 83.09 |
| 3.590 | 86.41 | 3.522 | 88.23 | 3.507 | 89.35 |
| 4.040 | 90.52 | 3.965 | 91.92 | 3.946 | 92.83 |
| 4.478 | 92.98 | 4.397 | 94.20 | 4.376 | 94.82 |
| 4.909 | 94.56 | 4.823 | 95.74 | 4.800 | 96.07 |
| 5.335 | 95.66 | 5.243 | 96.97 | 5.219 | 96.98 |
| 5.757 | 96.47 | 5.657 | 98.06 | 5.636 | 97.73 |
| 6.176 | 97.15 | 6.067 | 99.10 | 6.049 | 98.36 |
| 6.592 | 97.71 | 6.474 | 99.80 | 6.459 | 99.08 |
| 7.006 | 98.25 | 6.879 | 100.09 | 6.865 | 99.85 |
| 7.417 | 98.80 | 7.285 | 100.16 | 7.269 | 100.39 |
| 7.826 | 99.37 | 7.689 | 100.20 | 7.673 | 100.57 |
| 8.232 | 99.96 | 8.094 | 100.21 | 8.076 | 100.63 |
| 8.636 | 100.33 | 8.499 | 100.22 | 8.478 | 100.66 |

| Example 7 Calcium Silicate Beads 060201-01 | | Example 8 Calcium Silicate Beads 060202-01 | | Example 9 Calcium Silicate Beads 060202-02 | |
|---|---|---|---|---|---|
| cum. PV/T | $P_{bulb}$ | cum. PV/T | $P_{bulb}$ | cum. PV/T | $P_{bulb}$ |
| 0.000 | 0.38 | 0.000 | 0.36 | 0.000 | 0.35 |
| 0.771 | 20.60 | 0.778 | 19.14 | 0.772 | 20.33 |
| 1.448 | 41.16 | 1.457 | 40.66 | 1.444 | 42.22 |
| 2.044 | 58.71 | 2.052 | 58.90 | 2.031 | 60.65 |
| 2.576 | 72.59 | 2.582 | 73.04 | 2.552 | 74.89 |
| 3.061 | 82.69 | 3.067 | 82.79 | 3.029 | 84.62 |
| 3.517 | 89.14 | 3.525 | 88.56 | 3.480 | 90.18 |
| 3.956 | 92.75 | 3.968 | 91.85 | 3.917 | 93.21 |
| 4.386 | 94.78 | 4.402 | 93.98 | 4.346 | 95.06 |
| 4.810 | 96.09 | 4.829 | 95.42 | 4.768 | 96.31 |
| 5.229 | 96.98 | 5.251 | 96.55 | 5.187 | 97.23 |
| 5.646 | 97.73 | 5.668 | 97.45 | 5.602 | 97.96 |
| 6.059 | 98.44 | 6.082 | 98.26 | 6.014 | 98.63 |
| 6.468 | 99.15 | 6.492 | 99.03 | 6.423 | 99.32 |
| 6.875 | 99.79 | 6.899 | 99.78 | 6.829 | 100.05 |
| 7.280 | 100.28 | 7.303 | 100.41 | 7.232 | 100.54 |
| 7.683 | 100.52 | 7.706 | 100.72 | 7.634 | 100.79 |
| 8.086 | 100.59 | 8.107 | 100.86 | | |
| 8.489 | 100.66 | 8.509 | 100.91 | | |

| Control<br>Empty Bulb 10 cc volume<br>(No ballast material used) | |
|---|---|
| Cum. PV/T | $P_{bulb}$ |
| 0.000 | 0.26 |
| 0.752 | 24.85 |
| 1.406 | 45.99 |
| 1.977 | 64.08 |
| 2.478 | 79.33 |
| 2.922 | 91.73 |
| 3.336 | 98.26 |
| 3.745 | 99.24 |

| Comparative Example 1<br>MARINITE ® 1 | | Comparative Example 2<br>MARINITE ® 2 | | Comparative Example 3<br>MARINITE ® 060116m1 | |
|---|---|---|---|---|---|
| Cum. PV/T | $P_{bulb}$ | Cum. PV/T | $P_{bulb}$ | Cum. PV/T | $P_{bulb}$ |
| 0.000 | 0.26 | 0.000 | 0.3 | 0.000 | 0.33 |
| 0.819 | 10.20 | 0.790 | 16.57 | 0.790 | 16.54 |
| 1.565 | 26.15 | 1.486 | 36.82 | 1.488 | 36.52 |
| 2.240 | 41.51 | 2.103 | 54.14 | 2.107 | 53.71 |
| 2.854 | 54.78 | 2.655 | 68.20 | 2.661 | 67.66 |
| 3.418 | 65.65 | 3.159 | 78.64 | 3.168 | 78.11 |
| 3.942 | 74.15 | 3.631 | 85.80 | 3.641 | 85.30 |
| 4.438 | 80.51 | 4.081 | 90.36 | 4.094 | 89.92 |
| 4.912 | 85.09 | 4.518 | 93.13 | 4.533 | 92.80 |
| 5.372 | 88.28 | 4.948 | 94.88 | 4.963 | 94.64 |
| 5.822 | 90.48 | 5.372 | 96.01 | 5.388 | 95.89 |
| 6.264 | 92.04 | 5.792 | 96.81 | 5.809 | 96.64 |
| 6.701 | 93.16 | 6.210 | 97.37 | 6.227 | 97.30 |
| 7.135 | 94.02 | 6.626 | 97.84 | 6.643 | 97.76 |
| 7.565 | 94.67 | 7.040 | 98.15 | 7.058 | 98.14 |
| 7.993 | 95.21 | 7.453 | 98.42 | 7.471 | 98.41 |
| 8.419 | 95.62 | 7.866 | 98.63 | 7.883 | 98.61 |
| 8.843 | 96.01 | 8.277 | 98.82 | 8.294 | 98.82 |
| 9.266 | 96.31 | 8.687 | 98.99 | 8.705 | 99.02 |
| 9.687 | 96.58 | 9.097 | 99.12 | 9.115 | 99.04 |
| 10.108 | 96.82 | 9.507 | 99.22 | 9.525 | 99.13 |
| | | 9.916 | 99.32 | 9.934 | 99.23 |
| | | 10.324 | 99.4 | 10.343 | 99.26 |
| | | 10.732 | 99.48 | 10.752 | 99.5 |
| | | 11.140 | 99.54 | 11.160 | 99.48 |
| | | 11.548 | 99.59 | 11.568 | 99.42 |
| | | 11.956 | 99.62 | 11.977 | 99.46 |
| | | 12.363 | 99.65 | 12.384 | 99.57 |
| | | 12.770 | 99.67 | 12.792 | 99.65 |
| | | 13.178 | 99.68 | 13.199 | 99.66 |
| | | 13.585 | 99.7 | 13.607 | 99.63 |
| | | 13.992 | 99.73 | 14.014 | 99.72 |
| | | 14.399 | 99.75 | 14.421 | 99.67 |
| | | 14.806 | 99.79 | 14.828 | 99.71 |
| | | 15.212 | 99.8 | 15.236 | 99.69 |
| | | 15.619 | 99.81 | 15.643 | 99.67 |
| | | 16.026 | 99.85 | 16.050 | 99.80 |
| | | 16.432 | 99.86 | 16.456 | 99.79 |
| | | 16.838 | 99.87 | 16.863 | 99.89 |
| | | 17.245 | 99.88 | 17.270 | 99.76 |
| | | 17.651 | 99.89 | 17.676 | 99.8 |

| Comparative Example 4<br>MARINITE ® 060205-m1 | | Comparative Example 5<br>MARINITE ® 060206-m1 | |
|---|---|---|---|
| Cum. PV/T | $P_{bulb}$ | Cum. PV/T | $P_{bulb}$ |
| 0.000 | 0.35 | 0.000 | 0.39 |
| 0.836 | 6.48 | 0.827 | 8.49 |
| 1.598 | 22.68 | 1.580 | 24.44 |
| 2.285 | 38.80 | 2.263 | 39.97 |
| 2.909 | 52.73 | 2.883 | 53.46 |
| 3.478 | 64.36 | 3.451 | 64.62 |
| 4.006 | 73.64 | 3.979 | 73.38 |
| 4.501 | 80.42 | 4.478 | 79.86 |
| 4.977 | 84.93 | 4.955 | 84.5 |
| 5.438 | 87.99 | 5.417 | 87.78 |
| 5.889 | 90.13 | 5.869 | 90.09 |
| 6.333 | 91.70 | 6.312 | 91.74 |
| 6.772 | 92.89 | 6.751 | 92.95 |
| 7.206 | 93.81 | 7.185 | 93.89 |
| 7.637 | 94.49 | 7.615 | 94.64 |
| 8.066 | 95.00 | 8.043 | 95.26 |
| 8.492 | 95.53 | 8.468 | 95.75 |
| 8.917 | 95.99 | 8.892 | 96.14 |
| 9.339 | 96.36 | | |
| 9.760 | 96.69 | | |
| 10.180 | 96.96 | | |

Statistical Treatment of Example and Comparative Results:

| | Nominal Refrigerant Gas Charge Number Nine* | average & std. dev. | range | relative std dev |
|---|---|---|---|---|
| COMPARATIVE EXAMPLES:<br>(single blocks of MARINITE ®) | | | | |
| MARINITE ® 1 | 85.09 | 91.052 | 102.1128 | 0.121478 |
| MARINITE ® 2 | 94.88 | 11.06083 | 79.99117 | |
| 060116m1 | 94.64 | | | |
| 060205m1 | 84.93 | | | |
| 060206m1 | 84.50 | | | |
| INVENTION EXAMPLES:<br>Calcium Silicate Beads | | | | |
| 060126-01 | 94.07 | | | |
| 060130-01 | 93.98 | 95.25444 | 97.02812 | 0.01862 |
| 060130-01 | 95.05 | 1.773672 | 93.48077 | |
| 060130-01 | 94.56 | | | |
| 060201-01 | 96.07 | | | |
| 060201-01 | 96.09 | | | |
| 060201-02 | 95.74 | | | |
| 060202-01 | 95.42 | | | |
| 060202-02 | 96.31 | | | |

*Charge number nine is indicated in the above tables by the highlighted row in each Example and Comparative Example. Charge number nine is substantially equivalent to the normal amount of working fluid used in thermal sensing bulbs. The empty bulb reached saturation in less than nine charges.

FIG. 2 is a graph showing the results of the foregoing Examples, Comparative Examples, and the empty bulb Control. The graph in FIG. 2 shows the data from the above Examples using the adsorption characteristic method described above. The Bulb pressure indicates saturated refrigerant at a value of approximately 100 psia for the constant chamber temperature used for these tests.

The empty bulb curve is from a set of data collected using an empty copper bulb (no ballast). While not to be bound by theory, it appears that the relevance of this curve is as follows. Placing a solid mass in the bulb should reduce the internal volume of the assembly, and thus one would expect the bulb so filled to require a lesser amount of refrigerant gas to become saturated. However, the date and curves generated after placing ballast in the bulb assembly show that the filled bulbs actually require more refrigerant to become saturated.

The theory is that some amount of refrigerant has been adsorbed to the surface of the ballast. Adsorption is an exothermic process, and has a significant effect on the thermodynamic equilibrium of the refrigerant gas.

The solid-line curves are representative of the prior art MARINITE® block ballast.

The dashed-line curves represent the above-identified Examples of particles including a calcium silicate hydrate in accordance with the present invention.

The arrows show the value of PV/T that represents the amount (mass) of refrigerant used to fill a nominal sensing bulb in production. At this point, the block MARINITE® varies in pressure by about 12%, while the pressure in bulbs containing the particles including a calcium silicate hydrate in accordance with the present invention varies only by about 3%, which constitutes a factor of four improvement in uniformity of response. Thus, the adsorption characteristic of the present invention is substantially more uniform than that of the prior art, as shown by these Examples and Comparative Examples.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A thermal sensing bulb for an expansion valve, the bulb containing a ballast material, the ballast material comprising a plurality of particles including a calcium silicate hydrate, wherein the particles are substantially uniform in physical characteristic and a given quantity of the particles exhibits a substantially uniform adsorption characteristic.

2. The thermal sensing bulb of claim 1 wherein the physical characteristic in which the particles are substantially uniform include one or more of size, shape, weight and density.

3. The thermal sensing bulb of claim 1 wherein the plurality of particles comprises from about 10 to about 10,000 said particles.

4. The thermal sensing bulb of claim 1 wherein the particles have an average particle size ranging from about 0.1 to about 10 mm.

5. The thermal sensing bulb of claim 1 wherein the particles further comprise a binder.

6. The thermal sensing bulb of claim 5 wherein the binder comprises wollastonite.

7. The thermal sensing bulb of claim 1 wherein the particles further comprise one or more filler.

8. A refrigeration system comprising:
a thermostatic expansion valve, said expansion valve comprising a thermal sensing bulb, said thermal sensing bulb comprising a working fluid, said working fluid sealed inside said thermal sensing bulb and in operative communication with said expansion valve; and
a ballast in said thermal sensing bulb, said ballast including a plurality of particles comprising a calcium silicate hydrate, wherein the particles are substantially uniform in physical characteristic and a given quantity of the particles exhibits a substantially uniform adsorption characteristic.

9. The refrigeration system of claim 8 wherein the physical characteristic in which the particles are substantially uniform include one or more of size, shape, weight and density.

10. The refrigeration system of claim 8 wherein the plurality of particles comprises from about 10 to about 10,000 said particles.

11. The refrigeration system of claim 8 wherein the particles have an average particle size ranging from about 0.1 to about 10 mm.

12. The refrigeration system of claim 8 wherein the particles further comprise a binder.

13. The refrigeration system of claim 12 wherein the binder comprises wollastonite.

14. The refrigeration system of claim 8 wherein the particles further comprise one or more filler.

* * * * *